(12) United States Patent
BeSerra et al.

(10) Patent No.: US 10,915,389 B1
(45) Date of Patent: Feb. 9, 2021

(54) HARDWARE DEVICE ERROR ORIGIN IDENTIFICATION

(71) Applicant: Amazon Technologies, Inc., Seattle, WA (US)

(72) Inventors: Christopher James BeSerra, Federal Way, WA (US); Gavin Akira Ebisuzaki, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 15/701,204

(22) Filed: Sep. 11, 2017

(51) Int. Cl.
*G06F 11/07* (2006.01)
(52) U.S. Cl.
CPC ........ *G06F 11/079* (2013.01); *G06F 11/0751* (2013.01); *G06F 11/0772* (2013.01); *G06F 11/0793* (2013.01)
(58) Field of Classification Search
CPC .............. G06F 11/079; G06F 11/0751; G06F 11/0772; G06F 11/0793
USPC ............................................................ 714/2
See application file for complete search history.

(56) References Cited

U.S. PATENT DOCUMENTS

| 7,716,521 | B1* | 5/2010 | Donahue | G06F 9/3851 |
| | | | | 714/11 |
| 2002/0029358 | A1* | 3/2002 | Pawlowski | G06F 11/0772 |
| | | | | 714/39 |
| 2007/0061634 | A1* | 3/2007 | Marisetty | G06F 11/0793 |
| | | | | 714/48 |
| 2009/0049221 | A1* | 2/2009 | Rangarajan | G06F 13/24 |
| | | | | 710/268 |
| 2013/0339803 | A1* | 12/2013 | Vandervalk | G06F 11/2733 |
| | | | | 714/45 |
| 2016/0170824 | A1* | 6/2016 | Hamo | G06F 11/0772 |
| | | | | 714/763 |
| 2017/0091013 | A1* | 3/2017 | Tallam | G06F 11/0772 |
| 2019/0303229 | A1* | 10/2019 | Sherlock | H04L 41/00 |

OTHER PUBLICATIONS

Wong, Heymian, "PCI Express Multi-Root Switch Reconfiguration During System Operation", May 2011, Masters of Engineering Thesis, MIT, pp. 1-67 (Year: 2011).*
Tu, William C. et al., "Seamless Fail-over for PCIe Switched Networks", Jun. 2018, ACM SYSTOR 2018, pp. 1-11 (Year: 2018).*

* cited by examiner

*Primary Examiner* — Kamini B Patel
*Assistant Examiner* — Indranil Chowdhury
(74) *Attorney, Agent, or Firm* — Klarquist Sparkman, LLP (57) ABSTRACT

Technologies are provided for determining an identity of a hardware device that transmitted an error message via a communication bus. A chipset of the communication bus can be configured to transmit an interrupt to an interrupt handler in response to receipt of the error message. The interrupt handler can be configured to determine an identity of the hardware device based on the contents of the error message. The interrupt handler can be configured to transmit a notification to an error remediation service, wherein the notification is associated with the identity of the hardware device. The remediation service can be configured to use the identity of the hardware device to perform one or more error remediation operations. In at least some embodiments, the interrupt handler is configured to store the identifier in a memory and the error remediation service is configured to retrieve the identifier from the memory.

20 Claims, 8 Drawing Sheets

EXAMPLE TLP ERROR MESSAGE HEADER 700

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | FMT 740 | | TYPE 730 | | | | | R | TC | | | R | | | | TD | EP | ATR | | R | | LENGTH | | | | | | | | | |
| REQUESTOR ID 710 | | | | | | | | | | | | | | | | TAG | | | | | | | | MESSAGE CODE 720 | | | | | | | |
| RESERVED | | | | | | | | | | | | | | | | | | | | | | | | | | | | | | | |
| RESERVED | | | | | | | | | | | | | | | | | | | | | | | | | | | | | | | |

FIG. 8

HARDWARE DEVICE ERROR ORIGIN IDENTIFICATION

BACKGROUND

Many computing devices utilize internal communication bus technologies to facilitate communication between computing device components, such as processors, memories, storage devices, and peripheral devices connected to the computing device. Computing device components can be configured to transmit and receive messages via a communication bus of a computing device. In some cases, computing device components can be configured to transmit interrupt signals via a communication bus to notify other components about the occurrence of certain events. For example, some hardware devices are configured to transmit error messages via a communication bus when an error is detected. Some communication bus technologies (such as Peripheral Component Interconnect Express (PCIe)) can be configured to receive such an error message and transmit an interrupt to an interrupt handler (such as a firmware) in response. In at least some systems, such a firmware can be configured to receive the interrupt signal and scan components connected to the communication bus to attempt to identify the hardware device that detected the error. The firmware may subsequently transmit another interrupt signal that is processed by an operating system. Such an operating system can be configured to receive the interrupt signal from the firmware and subsequently may scan the components connected to the communication bus to attempt to identify the hardware device that detected the error. The operating system may be configured to perform remediation operations related to the hardware device.

DETAILED DESCRIPTION

In at least some preexisting systems, a firmware may be configured to handle an interrupt related to an error detected by a hardware device. The firmware may attempt to identify the hardware device that detected the error, and obtain more information about the error, by scanning computer components connected to a communication bus. In some such systems, based on a nature of the error, the firmware may be configured to transmit an interrupt signal that is then processed by an operating system. The operating system may attempt to identify the hardware device that detected the error, and obtain more information about the error, by scanning computer components connected to the communication bus. This scanning of computer components connected to the communication bus by the operating system and/or the firmware can add processing time to the error handling process. In at least some cases, the delay introduced by the scanning operations can negatively impact the system's ability to perform effective error remediation. For example, a hardware device may encounter a correctible error condition that, if handled promptly by a remediation service, may prevent the hardware device from entering a failure state. In at least some cases, the delay introduced by scanning the devices connected to a communication bus may prevent the remediation service from identifying the hardware device and correcting the error condition before the hardware device enters the failure state. In a scenario where a hardware device has encountered a fatal error condition, a delay introduced by scanning the devices connected to the communication bus may prevent the remediation service from isolating the hardware device and/or resetting the hardware device before the hardware device is used for subsequent operations.

At least some of the embodiments of the technologies described herein solve these problems by enabling an interrupt handler to determine an identity of a hardware device based on an error message transmitted by the hardware device via a communication bus, and enabling the interrupt handler to share the identity of the hardware device with a remediation service.

For example, a chipset of a communication bus can be configured to transmit an interrupt to an interrupt handler in response to receipt of an error message from a hardware device via the communication bus. The interrupt handler can be configured to transmit one or more commands to the chipset of the communication bus to retrieve all or part of the error message. Based on the retrieved parts of the error message, the interrupt handler can determine an identity of the hardware device that transmitted the error message. The interrupt handler can be configured to transmit a notification to an error remediation service, wherein the notification is associated with the identity of the hardware device. The remediation service can be configured to use the identity of the hardware device to perform one or more error remediation operations.

Figure 1:
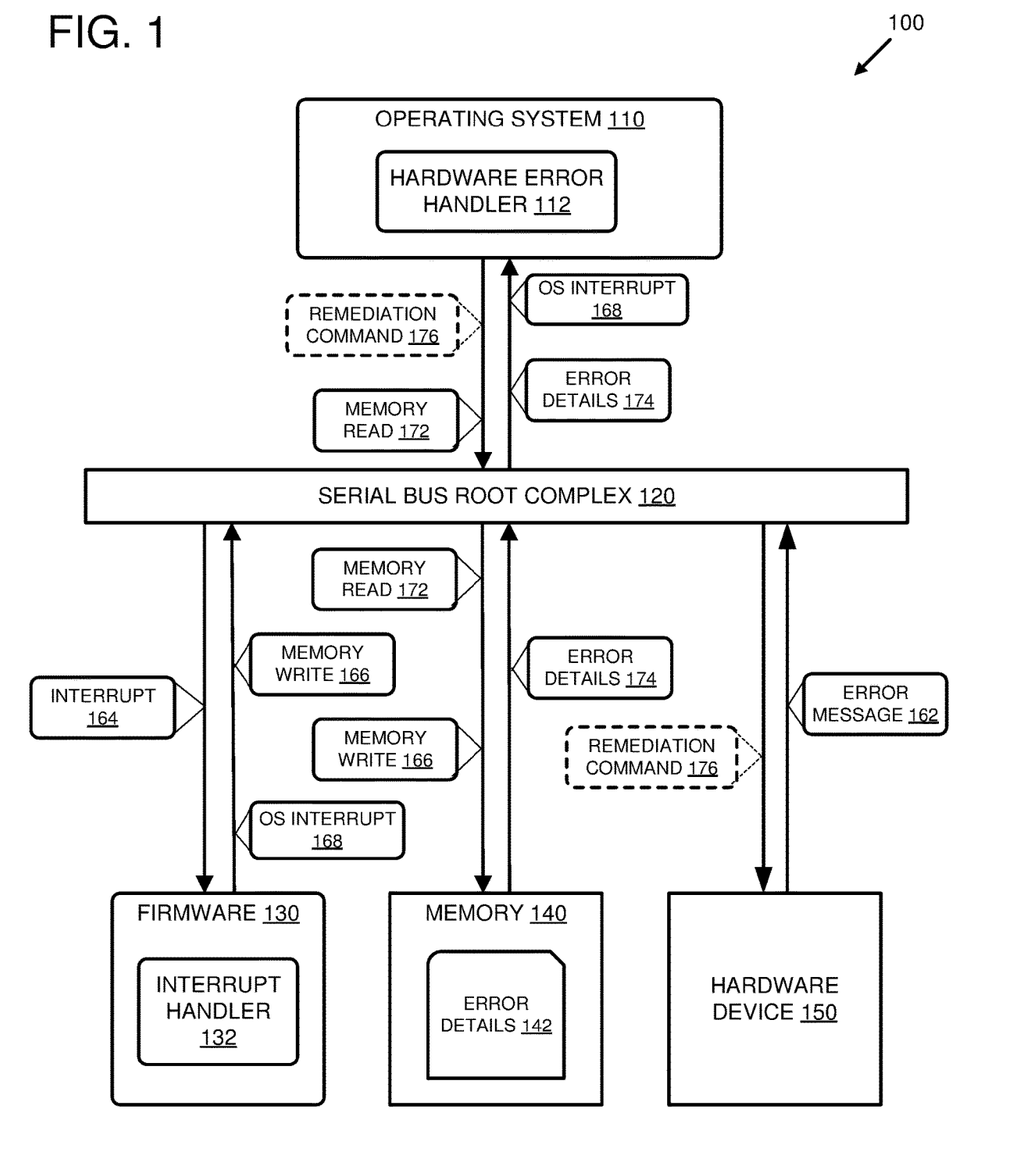
FIG. 1 is a system diagram depicting an example system configured to determine an identity of an originator of an error message.

FIG. 1 is a system diagram depicting an example system 100 configured to determine an identity of an originator of an error message 162.

The example system 100 comprises a serial data bus root complex 120 connected to an operating system 110, a firmware 130, a memory 140, and a hardware device 150. The hardware device 150 is configured to transmit an error message 162 to the serial data bus root complex 120. The hardware device 150 can transmit the error message 162 in response to encountering an error condition. For example, an error message (e.g., 162) can be generated by the hardware device 150 in response to one or more recoverable and/or non-recoverable error conditions detected by the hardware device 150.

The serial data bus root complex 120 can be configured to receive the error message 162 from the hardware device 150 and to transmit an interrupt 164 to the firmware 130. The firmware 130 can comprise an interrupt handler 132 that is configured to receive the interrupt 164 from the serial data bus root complex 120. The interrupt handler 132 can be configured to determine an identifier for the hardware device 150. For example, the determination can be based on the error message 162. The interrupt handler 132 can be configured to store an identifier for the hardware device 150 in the memory 140. In at least some embodiments, the interrupt handler 132 can be configured to write error details 142 comprising the identifier for the hardware device 150 to the memory 140 using one or more memory write commands 166. The firmware can transmit the one or more memory write commands 166 to the memory 140 via the serial data bus root complex 120.

The interrupt handler 132 is configured to transmit an interrupt 168 to the operating system 110 via the serial data bus root complex 120. The operating system 110 can comprise a hardware error handler 112 configured to receive the interrupt 168 via the serial data bus root complex 120. The hardware error handler 112 can be configured to retrieve the identifier for the hardware device 150 from the memory 140. For example, the hardware error handler 112 can be configured to transmit one or more memory read commands 172 to the memory 140 via the serial data bus root complex 120 and to receive the error details 174, comprising the identifier for the hardware device 150, in response.

The hardware error handler 112 can be configured to perform one or more hardware error remediation operations based on the identifier for the hardware device 150. For example, the hardware error handler 112 can be configured to isolate the hardware device 150, prevent subsequent data input and/or output access to the hardware device 150, etc. Optionally, the hardware error handler 112 can be configured to transmit one or more remediation commands 176 to the hardware device 150 via the serial data bus root complex 120. In at least some embodiments, the identifier for the hardware device 150 can comprise an identifier that can be used to route the one or more remediation commands 176 to the hardware device 150. In a different or further embodiment, the one or more remediation commands 176 can comprise commands to reset the hardware device 150 and/or reboot the hardware device 150. Additionally or alternatively, the one or more remediation commands 176 can comprise one or more commands to diagnose the error that occurred in the hardware device 150 (such as commands to retrieve additional error information, commands to retrieve diagnostic information, or the like).

In at least some embodiments, the serial data bus root complex 120 can comprise a peripheral component interconnect express (PCIe) root complex device. In such an embodiment, the serial data bus root complex 120 can be configured to receive and transmit messages from the operating system 110, the firmware 130, the memory 140, and/or the hardware device 150 via one or more PCIe links. For example, the serial data bus root complex 120 can be configured to receive the error message 162 from the hardware device 150 via one or more PCIe links and/or to transmit the interrupt 164 to the firmware 130 via one or more PCIe links.

Although the operating system 110 and the firmware 130 are depicted as being connected directly to the serial bus root complex 120, they are not necessarily separate hardware components. For example, the firmware 130 can comprise executable instructions that, when executed by one or more processors (not shown), cause the one or more processors to perform at least some of the operations ascribed herein to the firmware 130 and/or the interrupt handler 132. In such an embodiment, the interrupt 164 can be transmitted from the serial data bus root complex 120 to one or more of the processors, causing the processor to execute one or more of the instructions of the firmware 130. In a different or further embodiment, the operating system 110 can comprise executable instructions that, when executed by one or more processors, cause the one or more processors to perform at least some of the operations ascribed herein to the operating system 110 and/or the hardware error handler 112. In such an embodiment, the interrupt 168 can be transmitted from the firmware 130 to one or more of the processors, causing the processor to execute one or more of the instructions of the operating system 110. In at least one such embodiment, the interrupt handler 132 causes the interrupt 168 to be processed by one of the processors to trigger the execution of the hardware error handler 112 without transmitting the interrupt 168 via the serial data bus root complex 120.

In any of the examples described herein, a hardware device can be a device configured to perform one or more computer-related tasks. Example hardware devices include storage devices (such as hard drives, solid state storage devices, etc.), video cards, sound cards, network cards, recording devices (such as audio recording devices, video cameras, etc.), user input devices (such as keyboards, mice, etc.), and output devices (such as audio output devices, visual display devices, etc.). The hardware device can be connected to a communication bus (such as a serial data bus or the like) of a computing device. In at least some embodiments, the hardware device can be a peripheral component of a computing device (i.e., a component connected to a communication bus uplink connection of the computing device). Alternatively or additionally, the hardware device can be an integrated component of the computing device (such as an integrated graphical processing unit, an integrated network communication device, etc.).

The hardware device can be configured to transmit messages and receive messages via the communication bus of the computing device. Using the communication bus, the hardware device can communicate with one or more processors of the computing device, one or more memories of the computing device, one or more other hardware devices connected to the communication bus, or some combination thereof. The hardware device can be configured to detect an error and transmit an error message via the communication bus.

In at least some embodiments, the transmission of a message via the communication bus can comprise more multiple communication bus types and/or multiple communication bus controllers. For example, a hardware device can be connected to a first communication bus of a first type and configured to transmit messages to a bus controller of the first communication bus. The bus controller of the first communication bus can be configured to receive the messages and, for at least some of the messages, transmit the messages via a second communication bus of a second type to a second bus controller for the second communication bus. In a particular example, a hardware device is connected to a universal serial bus (USB) via a USB connection and is configured to transmit messages to a USB controller. The USB controller is connected to a peripheral component interface express (PCIe) communication bus of the computing device via a PCIe uplink connection. The USB controller is configured to receive messages from the hardware device, to reformat at least some of the messages, and to transmit the reformatted messages to a root complex of the PCIe communication bus via the PCIe uplink connection. Other multi-communication bus configurations are also possible.

In any of the examples described herein, a communication bus can comprise communication channels configured to enable components (e.g., hardware devices, processors, firmwares, memories, etc.) of a computing device to communicate with one another. In any of the examples described herein, a communication bus can be a serial communication bus (a.k.a. a serial data bus). A serial communication bus can enable serial communication between multiple components connected to the communication bus. For example, a serial communication bus of a computing device can comprise multiple interconnects or links which connect the components of the computing device to one another and enable communication between the multiple components. Example serial communication busses include PCIe busses, serial AT attachment (SATA) busses, USB busses, or the like. In at least some embodiments, the serial communication bus can comprise a chipset configured to coordinate communication among components connected to the bus. For example, some serial communication bus architectures (such as PCIe) resemble communications networks in which messages comprising one or more data packets can be routed by a chipset or root complex (such as a PCIe root complex device) from a transmitting component to a receiving component. A data packet can comprise a packet header that contains routing information (such as an identifier for a device that transmitted the data packet, an identifier for a destination of the data packet, etc.) In at least some embodiments, the chipset can be configured to be a destination for some messages (such as error messages). In at least some cases, the chipset can generate one or more interrupt signals in response to the occurrence of certain events (such as receipt of an error message). At least some communication bus chipsets are configured to store message information for later access. For example, a PCIe root complex device can be configured to log error message headers in a message header log (e.g., using one or more registers, using one or more memory locations, etc.). Such a message header log can be accessed by transmitting one or more commands to the communication bus chipset.

In any of the examples described herein, a firmware can comprise hardware and/or software components that provide control and/or monitoring of one or more components of a computing device. In at least some embodiments, the firmware comprises executable instructions stored in a non-volatile storage location (such as a non-volatile random access memory (NVRAM), an electronically erasable programmable read-only memory (EEPROM), or the like). In a different or further embodiment, the firmware can comprise one or more hardware components (such as processing units, application-specific integrated circuits (ASICs), Field Programmable Gate Arrays (FPGAs), etc.). The firmware can be accessed by a processor of the computing device during a boot process of the computing device. Additionally or alternatively, the firmware can be accessed by one or more processors in response to receipt of an interrupt. For example, the firmware can comprise an interrupt handler configured to perform one or more operations in response to an interrupt. The firmware can be configured to send and/or receive messages via a communication bus of the computing device. In at least some embodiments, the firmware comprises executable instructions that are executed by a board management controller (BMC) of the computing device.

Figure 2:
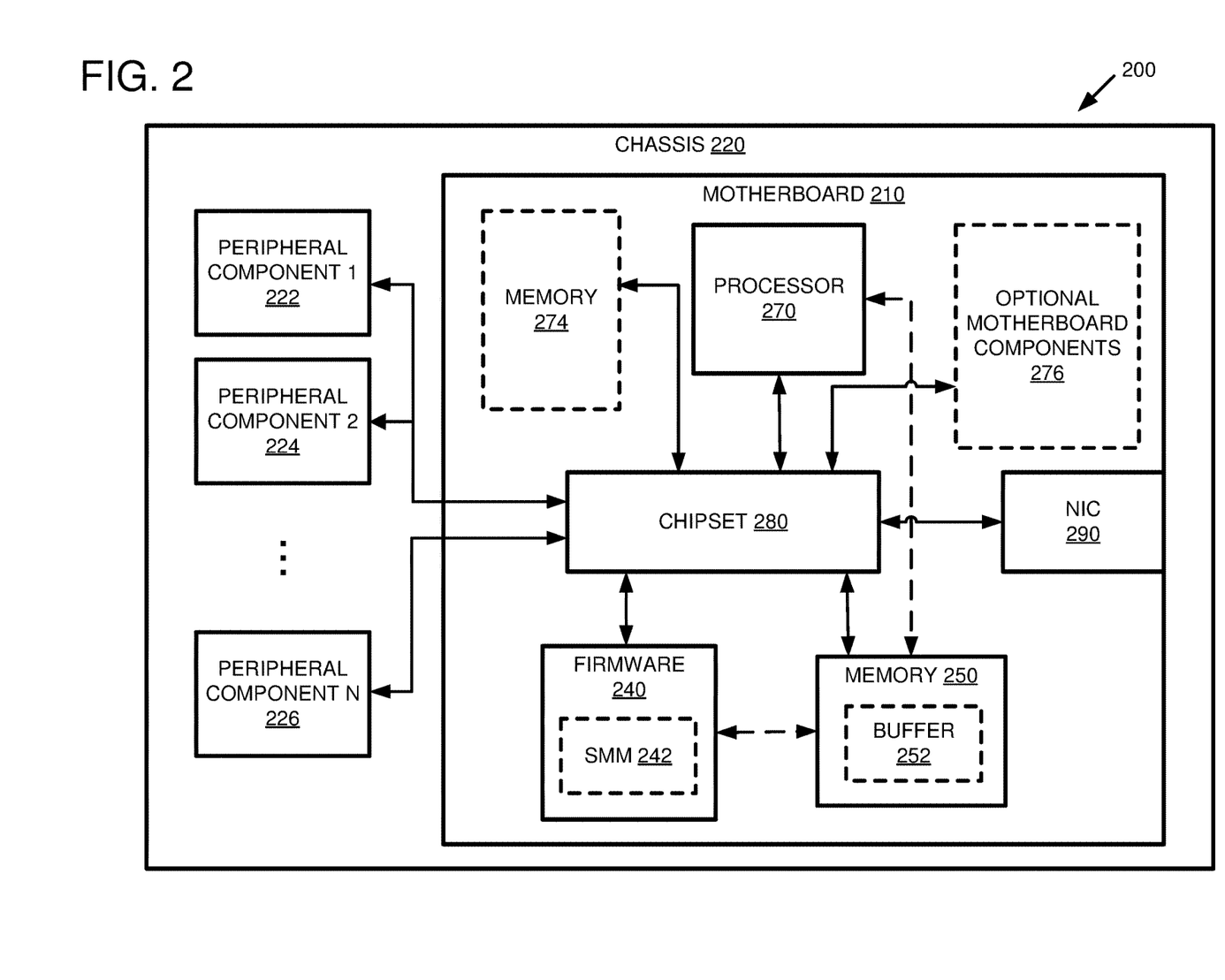
FIG. 2 is a system diagram depicting an example system comprising a firmware and one or more peripheral components connected to a system bus chipset.

FIG. 2 is a system diagram depicting an example computing system 200 comprising a firmware 240 and one or more peripheral components (e.g., 222-226) connected to a system bus chipset 280.

The example computing system 200 comprises a motherboard 210 and a chassis 220. The chassis 220 can include one or more peripheral components 222-226 (such as storage devices (e.g., hard drives, solid state storage devices), video cards, USB devices, etc.). The motherboard 210 can include a set of components that are common across multiple computing systems so that the motherboard 210 can be used in multiple different computing systems. The motherboard 210 and additional components, such as optional motherboard components 276, can be installed within the chassis 220.

The firmware 240 can be used to access and/or control one or more components integrated with or controlled by the motherboard (such as the peripheral components 222-226). For example, the firmware 240 can comprise one or more components that perform hardware initialization services and/or runtime services for an operating system (such as a Basic Input/Output System (BIOS), a Unified Extensible Firmware Interface (UEFI), or the like. Optionally, the firmware 240 can comprise a system management module 242 configured to support a system management mode for handling one or more system-wide functions (such as power management, hardware device control, or the like).

The firmware 240 can communicate with the processor 270 and other motherboard components via communication bus chipset 280. The communication bus chipset 280 can be used to manage communications between the processor 270 and other components of the motherboard 210 and the chassis 220. For example, the communication bus chipset 280 can include one or more bridges for converting between different signaling protocols. As a specific example, the processor 270 can communicate with the communication bus chipset 280 using a high-speed front-side bus. The hardware devices connected to the communication bus chipset 280 (such as a network interface card (NIC) 290 and/or the one or more peripheral components 222-226) can communicate with the communication bus chipset 280 using an input/output (IO) protocol, such as a serial I/O protocol. In a particular embodiment, the protocol is a Peripheral Component Interconnect Express (PCIe) protocol and the communication bus chipset 280 comprises a PCIe root complex. The communication bus chipset 280 can convert between, and manage communications between, the different protocols so that the processor 270 can communicate with one or more of the hardware devices through the communication bus chipset 280.

The motherboard 210 can comprise a memory 250 that is accessible by the firmware 240 and the processor 270. For example, the firmware 240 and the processor 270 can be configured to access the memory 250 via the communication bus chipset 280. Additionally or alternatively, the processor 270 and/or the firmware 240 can be configured to access the memory via a separate access interface. In at least some embodiments, the memory 250 can comprise a resident non-volatile random access memory that is accessible by the firmware 240 (and/or the processor 270) via a uniform firmware interface.

The memory 250 (and/or another memory 274) can store executable instructions that, when executed by the processor 270, cause the processor 270 to execute an operating system (not shown). The operating system and the firmware 240 can each have private memory (such as reserved portions of the memory 250, reserved portions of one or more other memories 274, etc.). The operating system and the firmware 240 can have one or more areas of shared memory (such as the memory buffer 252) where messages and/or data can be passed by writing to the shared memory.

The communication bus chipset 280 can be configured to receive an error message from one of the hardware devices (e.g., one of the peripheral components 222-226, the network interface card 290, one of the optional motherboard components 270, etc.) and to transmit an interrupt signal to the firmware 240 in response to receipt of the error message. In at least some embodiments, the chipset 280 is configured to route messages between the various components connected to the communication bus chipset 280. However, in at least some embodiments, a message can be directed to the communication bus chipset 280 itself. For example, in an embodiment where the I/O protocol is a serial protocol (such as the PCIe protocol), a message can contain one or more data fields that indicate that the communication bus chipset 280 is a target recipient of the message. In such an embodiment, the error message transmitted by the hardware device can comprise one or more data fields that indicate that the error message is directed to the communication bus chipset 280.

In at least some embodiments, the interrupt transmitted by the communication bus chipset 280 to the firmware 240 can be a system management interrupt (SMI). In such an embodiment, the system management module 242 can be configured to receive the SMI and place the system 200 in a system management mode. In a different or further embodiment, the communication bus chipset 280 is configured to transmit an interrupt to the firmware 240 when any error message is received from any connected hardware device. Alternatively, the communication bus chipset 280 can be configured to transmit the interrupt conditionally. For example, the communication bus chipset 280 can be configured to inspect one or more data fields of the received error message and to transmit the interrupt to the firmware 240 if the one or more data fields indicate that the error message was sent responsive to a detection of an unrecoverable error.

Responsive to receipt of the interrupt from the communication bus chipset 280, the firmware 240 can determine an identity of the hardware device that transmitted the error message to the communication bus chipset 280 and write an identifier of the hardware device to the memory 250. In at least some embodiments, the firmware 240 can determine the identity of the hardware device by extracting a hardware device identifier from the error message that was transmitted to the communication bus chipset 280. For example, the error message can contain a requestor ID data field that contains an identifier associated with the hardware device (and/or an I/O port of a data bus connected to the communication bus chipset to which the hardware device is attached) can be used to route messages to the hardware device via the communication bus chipset 280. In an embodiment where one or more data fields of the error message contain details about the error (such as an error or type, message code, etc.), the firmware 240 can be configured to extract one or more such data fields from the error message and to store the extracted one or more data fields in the memory 250 with the identifier of the hardware device that transmitted the error message.

After storing the identifier for the hardware device in the memory 250, the firmware 240 can be configured to transmit an error notification to the operating system. For example, the notification can comprise sending an interrupt (such as a system control interrupt (SCI)) to the processor 270 that will cause an error workflow handler of the operating system to be executed by the processor 270. Upon receipt of the error notification, the operating system can be configured to retrieve the identifier for the hardware device from the memory 250 (along with any additional information about the error stored in the memory 250 by the firmware 240) and to use the identifier for the hardware device to perform an error remediation operation to address the error. For example, the operating system can use the identifier for the hardware device to determine which hardware device transmitted the error message to the communication bus chipset 280, and to transmit messages to the hardware device via the communication bus chipset 280. For example, the operating system can be configured to transmit a reset message to the hardware device via the communication bus chipset 280, wherein the reset message comprises a data field storing the identifier for the hardware device that identifies the hardware device to the communication bus chipset 280 as a destination for the message.

In embodiments where additional information about the error was stored in the memory 250, the operating system can retrieve the additional information about the error and use it when determining which remediation operations to perform. For example, an error type that indicates whether or not the error that occurred was an unrecoverable error can be retrieved from the memory 250 and used by the operating system when deciding whether or not to use the hardware device for subsequent I/O operations. In a different or further embodiment, the firmware 240 can use such an error type associated with the error message to determine whether or not to transmit an error notification to the operating system. For example, the firmware 240 can be configured to transmit the error notification to the operating system only if the error type indicates that the error is a non-recoverable error.

Figure 3:
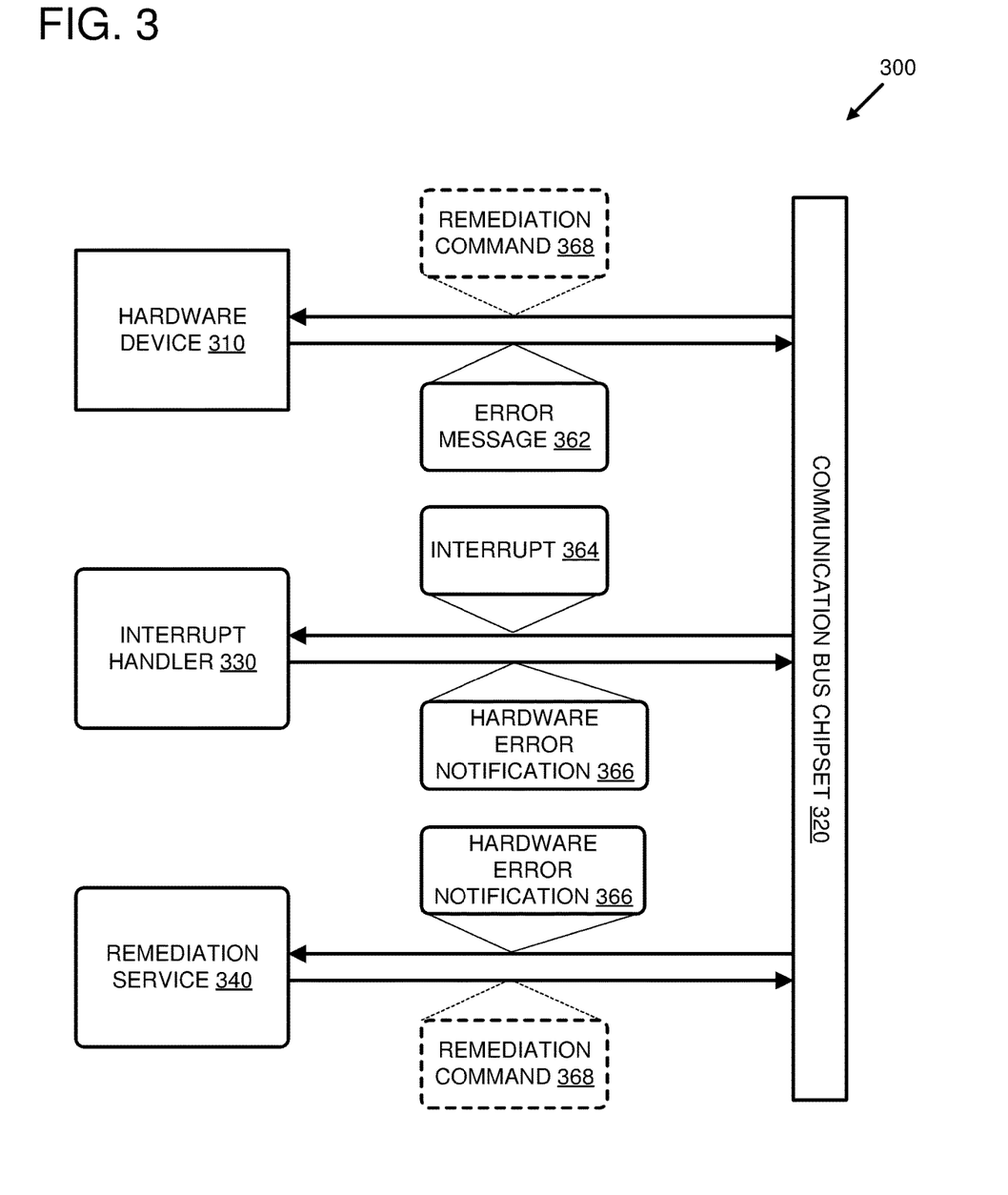
FIG. 3 is a system diagram depicting an example system comprising an interrupt handler and a remediation service configured to determine an identity of a failing hardware device.

FIG. 3 is a system diagram depicting an example system 300 comprising an interrupt handler 330 and a remediation service 340 configured to determine an identity of a failing hardware device 310.

The example system 300 comprises a communication bus chipset 320 that is connected to a hardware device 310. The hardware device 310 can be connected to the communication chipset 320 via one or more communication channels of the communication bus. The communication bus chipset 320 is configured to receive an error message 362 from the hardware device 310. The error message 362 can comprise an identifier for the hardware device 310. The error message 362 can be transmitted by the hardware device in response to detection of an error condition within the hardware device 310. For example, the hardware device 310 can transmit the error message 362 in response to detection of a recoverable error condition, a non-recoverable error condition, and/or a failure condition. In at least some embodiments, the error message 362 comprises information about the error condition that was encountered by the hardware device 310. For example the error message 362 can comprise data identifying a type of error condition that was encountered.

In response to receipt of the error message 362, the communication bus chipset 320 can be configured to transmit an interrupt 364 to an interrupt handler 330. The interrupt handler 330 can be connected to the communication bus chipset 320 via one or more communication channels of the communication bus. In at least some embodiments, the interrupt handler 330 can comprise a firmware connected to the communication bus chipset 320. For example, the communication bus chipset 320 can be configured to transmit the interrupt 364 to a processor connected to the communication bus chipset 320. In response to receipt of the interrupt 364, the processor can be configured to execute one or more instructions defined in the firmware. Additionally or alternatively, the interrupt handler 330 can comprise one or more dedicated hardware components of the computing device (such as one or more FPGAs, one or more ASICs, a system-on-a-chip (SoC), or the like).

The interrupt handler 330 is configured to determine an identifier for the hardware device 310 and to transmit a hardware error notification 366 to a remediation service 340 via the communication bus chipset 320, wherein the error notification 366 is associated with the identifier for the hardware device 310. In at least some embodiments, the interrupt handler 330 is configured to retrieve the identifier for the hardware device 310 from the error message 362 transmitted to the communication bus chipset 320 by the hardware device 310.

In a different or further embodiment, the interrupt handler 330 can be configured to store the identifier for the hardware device 310 in a memory (not shown) connected to the communication bus chipset 320. In such an embodiment, the remediation service 340 can be configured to retrieve the identifier for the hardware device 310 from the memory, responsive to receipt of the error notification 366. The memory can comprise a portion of a NVRAM that is accessible by both the interrupt handler 330 and the remediation service 340. For example, in an embodiment where the interrupt handler 330 comprises a firmware, the memory can comprise a portion of a NVRAM of the firmware that is also accessible by the remediation service 340. Additionally or alternatively, the memory can comprise a reserve portion of a memory accessible by the firmware and the remediation service 340. Such a reserve portion of the memory can comprise a memory map region that is accessible only by components in a hierarchical protection domain (such as a memory map region accessible by "ring 0" or "domain zero" components).

The remediation service 340 can be configured to perform one or more remediation operations in response to receipt of the error notification 366. The remediation service 340 can perform one or more of the remediation operations using the identifier for the hardware device associated with the error notification 366. For example, the remediation service 340 can use the identifier for the hardware device to transmit one or more remediation commands 368 to the hardware device 310 via the communication bus chipset 320. In at least some embodiments, the identifier for the hardware device 310 comprises a routing identifier that is used by the communication bus chipset 320 to determine that the received one or more remediation commands 368 are destined for the hardware device 310. The communication bus chipset 320 can transmit the one or more remediation commands 368 to the hardware device 310 via one or more communication channels of the communication bus that are connected to the hardware device 310.

In at least some embodiments, the remediation service 340 comprises one or more modules of an operating system that is/are configured to handle hardware device errors. In a different or further embodiment, the remediation service 340 can be part of a hypervisor of the computing device. Additionally or alternatively, the remediation service 340 can be part of a separate hardware device connected to the communication bus (e.g., a USB device comprising one or more modules for performing hardware error remediation services).

In at least some embodiments, the hardware error notification 366 can comprise another interrupt that is generated by the interrupt handler 333 and is handled by the remediation service 340. For example, in an embodiment where the remediation service 340 is part of an operating system, the interrupt handler 330 can be configured to generate a system control interrupt (SCI) that is processed by an error workflow handler of the operating system.

Figure 4:
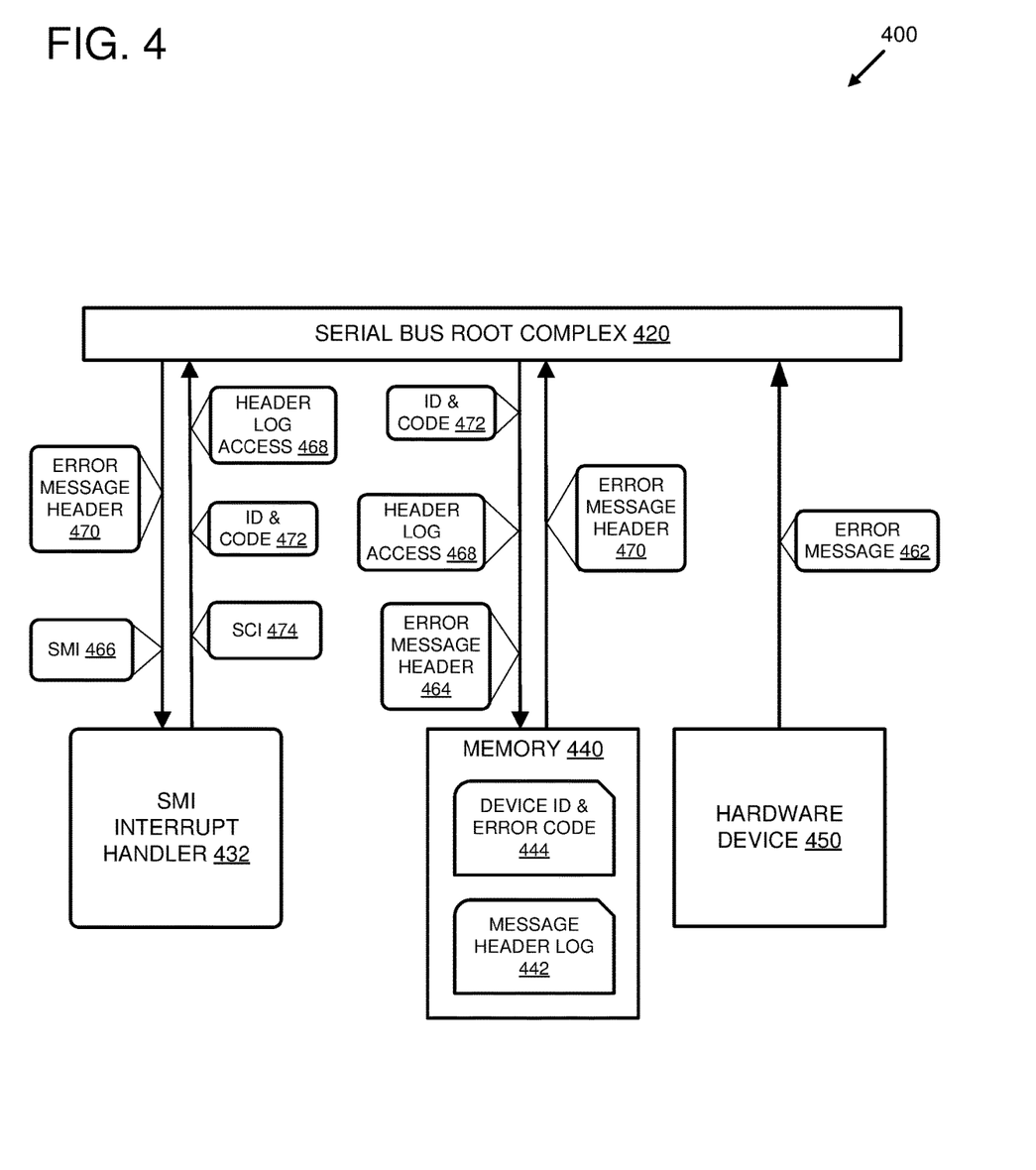
FIG. 4 is a system diagram depicting an example system comprising a system management interrupt handler configured to determine an originating hardware device using a message header log.

FIG. 4 is a system diagram depicting an example system 400 comprising a system management interrupt handler 432 configured to determine an originating hardware device 450 for an error message 462 using a message header log 442.

The example system 400 comprises a serial bus root complex 420 configured to receive an error message 462 from the hardware device 450 via one or more serial data communication channels. The error message 462 comprises an error message header containing an identifier for the hardware device 450 and an error code associated with an error that was detected by the hardware device 450. The serial bus root complex 420 is configured to store the error message header 464 of the error message 462 in a message header log 442. The message header log 442 can be stored in a memory 440. However, other storage locations for the message header log 442 are also possible. For example, the serial bus root complex 420 can comprise one or more data registers (not shown) wherein all or part of the error message header 464 can be stored.

The serial bus root complex 420 can transmit a system management interrupt 466 to the system management interrupt handler 432. In at least some embodiments, the system management interrupt handler 432 can be part of a system management module (SMM) of a firmware. The system management module can be configured to support a system management mode of execution upon receipt of the system management interrupt 466. In at least some embodiments, the serial bus root complex 420 is configured to transmit the system management interrupt 466 to a processor configured to execute the system management interrupt handler 432 in the firmware. Alternatively, the serial bus root complex 420 can be configured to transmit the system management interrupt 466 to a board management controller (BMC) configured to execute the system management interrupt handler 432 in the firmware.

The system management interrupt handler 432 is configured to transmit one or more commands 468 to the serial bus root complex 420 to retrieve the error message header 464 from the message header log 442. In an embodiment where the message header log 442 is stored in the memory 440, a serial bus root complex 420 can transmit the one or more commands 468 to access the header log 442 in the memory 440. In response, the memory 440 can be configured to transmit the requested error message header 470 back to the serial bus root complex 420. In an embodiment where the error message header log is stored in one or more registers of the serial bus root complex 420, the serial bus root complex 420 can be configured to retrieve the error message header 470 from the one or more registers. The serial bus root complex 420 can be configured to transmit the error message header 470 to the system management interrupt handler 432.

The system management interrupt handler 432 can be configured to extract the hardware device identifier and the error code from the error message header 470. The system management interrupt handler 432 can then to transmit one or more memory write commands 472 to the memory 440 via the serial bus root complex 420 to store the extracted hardware device identifier and error code 444 in the memory 440. In at least some embodiments, the system management interrupt handler 432 can be configured to use the hardware device identifier and/or the error code to determine whether or not to transmit the one or more memory write access commands 472. For example, the system management interrupt handler 432 can be configured to take no further action if the error code indicates that the error detected by the hardware device 450 was a correctable error. Additionally or alternatively, the system management interrupt handler 432 can use the hardware device identifier to determine that the hardware device 450 is not a device for which error remediation should be performed and can be configured to take no further action.

After storing the hardware device identifier and error code 444 and the memory 440, the system management interrupt handler 432 can transmit a system control interrupt 474 to the serial bus root complex 420. Alternatively, a processor executing the system management interrupt handler 432 can be configured to raise a system control interrupt that will then be processed by a system control interrupt handler without transmitting a system control interrupt via the serial bus root complex 420. In an embodiment where the system management interrupt handler 432 is part of the system management module, the system management interrupt handler 432 can be configured to exit a system management mode after transmitting the system control interrupt 474.

The interrupt handler (not shown) to which the system control interrupt 474 is transmitted can be configured to retrieve the hardware device identifier and error code 444 from the memory 440. The interrupt handler can then use the hardware device identifier in the error code when performing remediation operations to address the error detected by the hardware device 440. For example, the interrupt handler can use the hardware device identifier to determine that the error message 462 originated from the hardware device 450. The interrupt handler can use the error code to determine a nature of the area that was detected. For example, the error code can indicate whether the error detected by the hardware device 450 is correctable or uncorrectable. Additionally or alternatively, the error code can indicate whether the error detected by the hardware device 450 is fatal or nonfatal. In at least some embodiments, additional information about the error detected by the hardware device 450 can be transmitted as part of the error message 462 and stored in the memory 440. In such embodiments, the interrupt handler can retrieve the additional error information and use it to determine what error remediation operations to perform.

Figure 5:
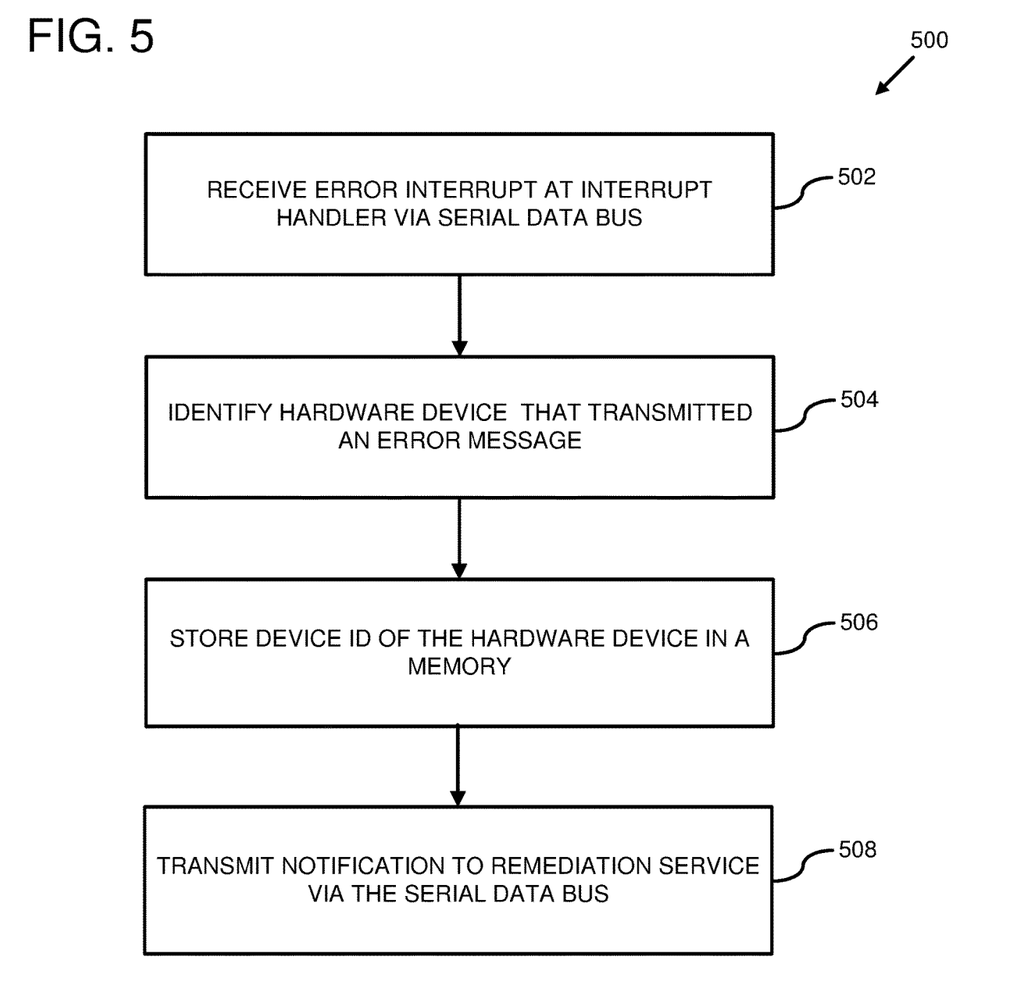
FIG. 5 is a flowchart of an example method for sharing an identity of a hardware device that transmitted an error message with a remediation service.

FIG. 5 is a flowchart of an example method 500 for sharing an identity of a hardware device that generated an error message with a remediation service. Any of the example systems described herein can be used to perform the example method 500.

At 502, an error interrupt is received at an interrupt handler via a serial data bus. For example, the error interrupt can be received at the interrupt handler from a chipset (such as a root complex device) of the serial data bus. In at least some embodiments, the interrupt handler can comprise one or more modules of a firmware. In such an embodiment, the interrupt handler can be executed by a processor connected to the serial data bus after the error interrupt is received. The error interrupt can be transmitted by the chip set of the serial data bus in response to receipt of an error message from a hardware device connected to the serial data bus. The error message can indicate that the hardware device encountered an error condition. In at least some embodiments, the error message can indicate whether or not the error condition is correctable and/or fatal. In at least some embodiments, whether the error interrupt is transmitted by the serial data bus chipset can be based on a determination by the serial data bus chipset that the error was uncorrectable and/or fatal.

At 504, a hardware device that transmitted the error message is identified. The interrupt handler can extract an identifier for the hardware device from the error message that was transmitted by the hardware device to the chipset. In at least some embodiments, the serial data bus chipset is configured to store all or part of the error message in a message log. In such an embodiment, the interrupt handler can retrieve all or part of the error message from the message log and extract the identifier for the hardware device from the retrieved error message data. Retrieving all or part of the error message from the message log can comprise transmitting one or more commands to the serial data bus chipset via the one or more serial communication channels of the serial data bus. Additionally or alternatively, retrieving the all or part of the error message can comprise transmitting one or more data access commands to a memory or storage device connected to the serial data bus.

At 506, the device identifier for the hardware device is stored in a memory. The interrupt handler can transmit one or more memory access commands to a memory in order to store the device identifier for the hardware device in the memory. In at least some embodiments, the one or more memory access commands are transmitted to the memory via the serial data bus. Alternatively, a processor executing the interrupt handler can be configured to transmit the device identifier for the hardware device to the memory using one or more other data communication channels. For example, the processor can be configured to transmit the device identifier for the hardware device to the memory via a direct memory access (DMA) controller and/or a front-side bus.

At 508, a notification is transmitted to a remediation service via the serial data bus. The notification can comprise another interrupt, such as a system control interrupt, that the remediation service is configured to receive. In at least some embodiments, the remediation service can be part of an operating system for a computing device comprising the serial data bus. In such an embodiment, the operating system can be configured to receive the notification and to invoke the remediation service in response. Additionally or alternatively, a processor receiving the system control interrupt that is part of the notification can be configured to execute one or more modules comprising the remediation service of the operating system stored in a particular location in memory in response. In at least some embodiments, the remediation service can be part of a hypervisor of the computing device instead of part of an operating system. Alternatively, the remediation service can comprise a separate hardware device connected to the serial data bus. In such an embodiment, the chipset of the serial data bus can be configured to transmit the error notification from the interrupt handler to the separate hardware device by the serial data bus.

Figure 6:
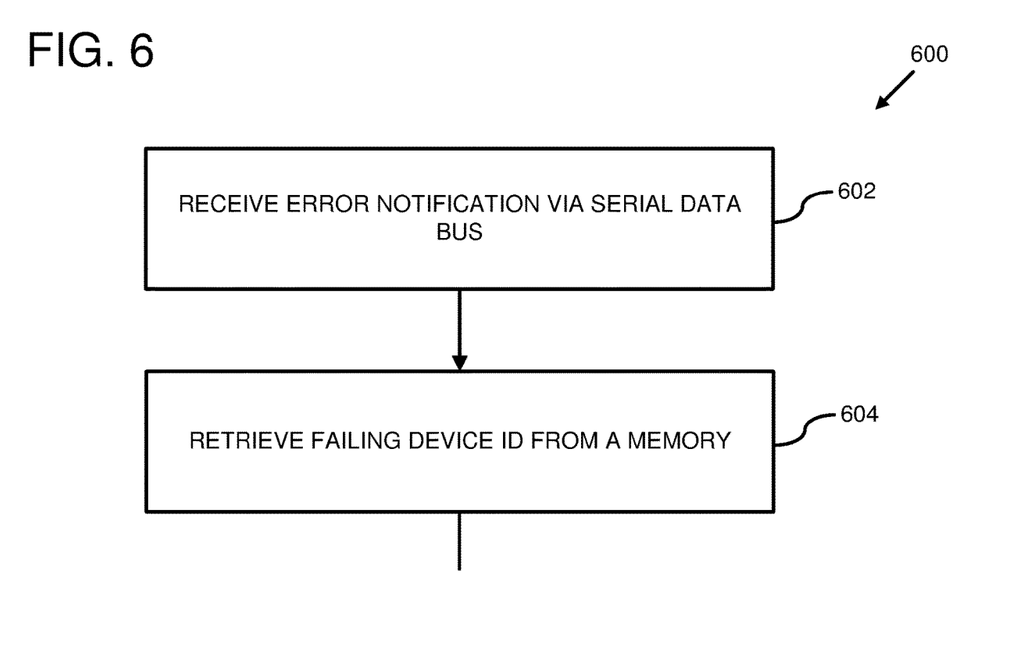
FIG. 6 is a flowchart of an example method for processing an error notification by a remediation service.

FIG. 6 is a flowchart of an example method 600 for processing an error notification by a remediation service. Any of the example systems described herein can be used to perform the example method 600.

At 602, an error notification is received via a serial data bus. The error notification can indicate to the remediation service that an interrupt handler connected to the serial data bus has processed an error interrupt and stored an identifier for a failing hardware device in a memory.

At 604, a failing hardware device identifier is retrieved from the memory. The memory can be a memory region that is accessible by the interrupt handler and the remediation service. For example, in an embodiment where the interrupt handler is part of a firmware of the computing device, the failing hardware device identifier can be stored by the interrupt handler in an NVRAM of the firmware. Alternatively, the failing hardware device identifier can be stored by the interrupt handler in a memory map region that is accessible by the firmware comprising the interrupt handler and a kernel of an operating system comprising the remediation service. In at least some embodiments, the remediation service is configured to retrieve the failing device identifier from the memory by transmitting one or more memory read access commands to the memory via the serial data bus. Additionally or alternatively, the remediation service can be configured to transmit one or more memory read access commands to the memory via one or more alternative communication channels (such as one or more DMA command, etc.).

At 606, one or more failure remediation operations are performed using the retrieved hardware device identifier. For example, the remediation service can transmit a device reset command (such as a function level reset command, a secondary bus reset command, etc.) to the failing hardware device via the serial data bus. The identifier for the failing hardware device can be used to indicate a destination of the reset command to the chipset of the serial data bus. Additionally or alternatively, the remediation service can perform one or more operations to isolate the failing hardware device. For example, if the failing hardware device is an I/O mapped device or a memory mapped device, the remediation service can perform one or more operations to remove the mapping in order to isolate the failing hardware device. In such an embodiment, the identifier for the failing hardware device can be used to locate the mapping to be removed.

In at least one embodiment, performing the remediation operations can comprise terminating a virtual machine connected to the failing hardware device. The remediation service can be configured to reboot the virtual machine and to reset the failing hardware device using the device identifier.

Figure 7:
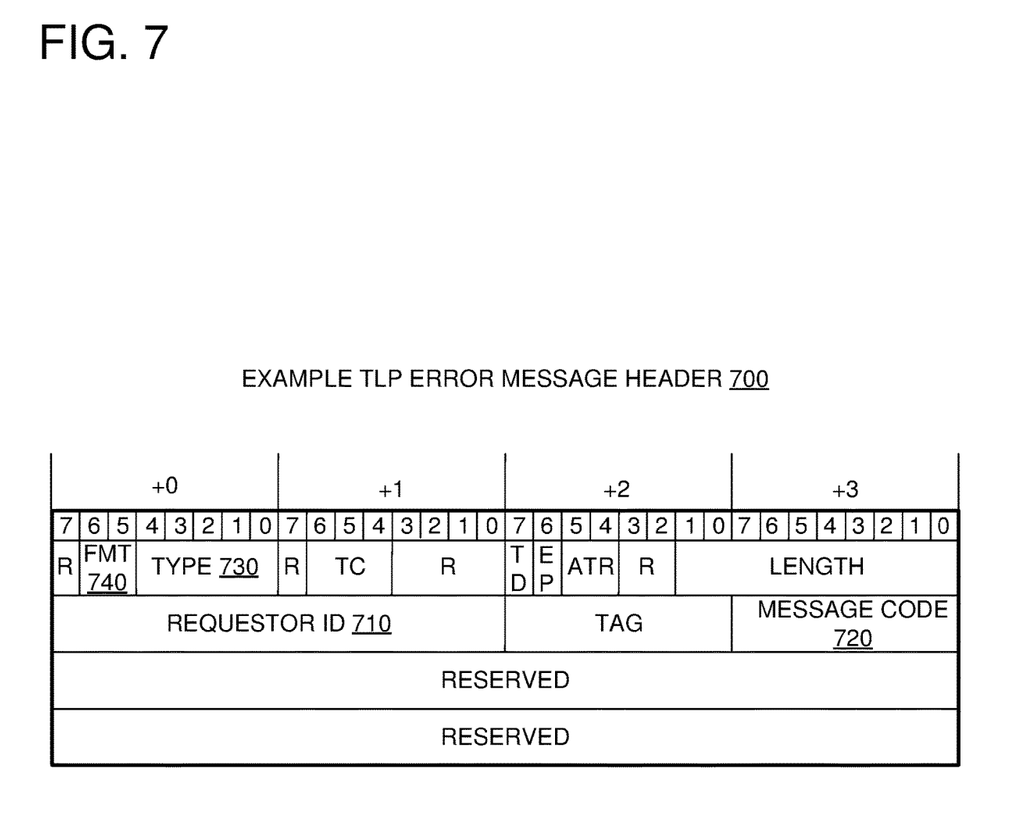
FIG. 7 depicts an example Peripheral Component Interconnect Express transaction layer protocol error message header which may be used by at least some of the described examples.

FIG. 7 depicts an example PCIe transaction layer protocol error message header 700 which can be used by at least some of the described examples. In an embodiment where a hardware device that transmits an error message is connected to a PCIe serial data bus, the error message can be a PCIe transaction layer protocol message comprising the message header 700. The requestor identifier field 710 can contain an identifier for the hardware device that transmitted the error message. For example, the requestor identifier 710 can contain an encoded bus device function that can be used by the PCIe root complex to determine a unique path to the hardware device.

The message code field 720 can contain a value that indicates a type of the error that was encountered by the hardware device. In a particular embodiment, the message code field 720 can contain either a value indicating that the hardware device detected a correctable error; a value indicating that the hardware device detected a non-fatal, uncorrectable error; or a value indicating that the hardware device detected a fatal, uncorrectable error. In at least some embodiments, the type field 730 can contain a value indicating that the error message should be handled by the PCIe root complex, instead of being routed to another device connected to the root complex. In a different or further embodiment, the format field 740 can contain a value indicating whether the body of the error message contains any data.

The root complex can be configured to inspect the values of the message code field 720 and/or the type field 730 to determine that the message comprising the message header 700 is an error message to be handled by the root complex. Additionally or alternatively, the root complex can use the value of the message code field 720 to determine whether or not to transmit an interrupt to a firmware. The root complex can be configured to save the error message header 700 in a log (for example, using one or more PCIe registers, using a memory, etc.).

The firmware can be configured to receive the interrupt from the root complex and to retrieve the error message header 700 from the log. The firmware can extract an identifier for the hardware device from the requester identifier field 710 of the error message header 700. The firmware can save the identifier for the hardware device in a memory location where it can be accessed by an operating system. In at least some embodiments, the firmware can be configured to extract the value from the message code field 720 and to also save it in a memory location where can be accessed by the operating system. In a different or further embodiment, the firmware can be configured to use the value of the message code field 722 determine whether or not to save the identifier of the hardware device in the memory and/or transmit a notification to the operating system. For example, the firmware can be configured to store the hardware device identifier and notify the operating system if the value of the message code 720 indicates that a fatal, uncorrectable error was detected or that a non-fatal, uncorrectable error was detected. The firmware can be configured to not store the hardware device identifier and to not notify the operating system if the value of the message code 720 indicates that a correctable error was detected.

If the firmware transmits a notification to the operating system, the operating system can retrieve the identifier for the hardware device (and in some cases the value of the message code field 720) from the memory. The operating system can then use the identifier for the hardware device to perform remediation operations related to the error. For example, the operating system can transmit one or more PCIe messages to the hardware device via the root complex, wherein the one or more messages comprise message headers that identify the hardware device using the hardware device identifier. Upon receipt of the one or more messages, the root complex can use the identifier for the hardware device to route the one or more messages to the hardware device via one or more PCIe links. In at least some embodiments, remediation operations performed by the operating system can be based on the value of the message code field 720 retrieved from the memory. For example, different operations can be taken in reaction to the detection of a non-fatal error than are taken in reaction to the detection of a fatal error. Additionally or alternatively, different operations can be taken in reaction to the detection of a correctable error than are taken in reaction to the detection of an uncorrectable error.

Figure 8:
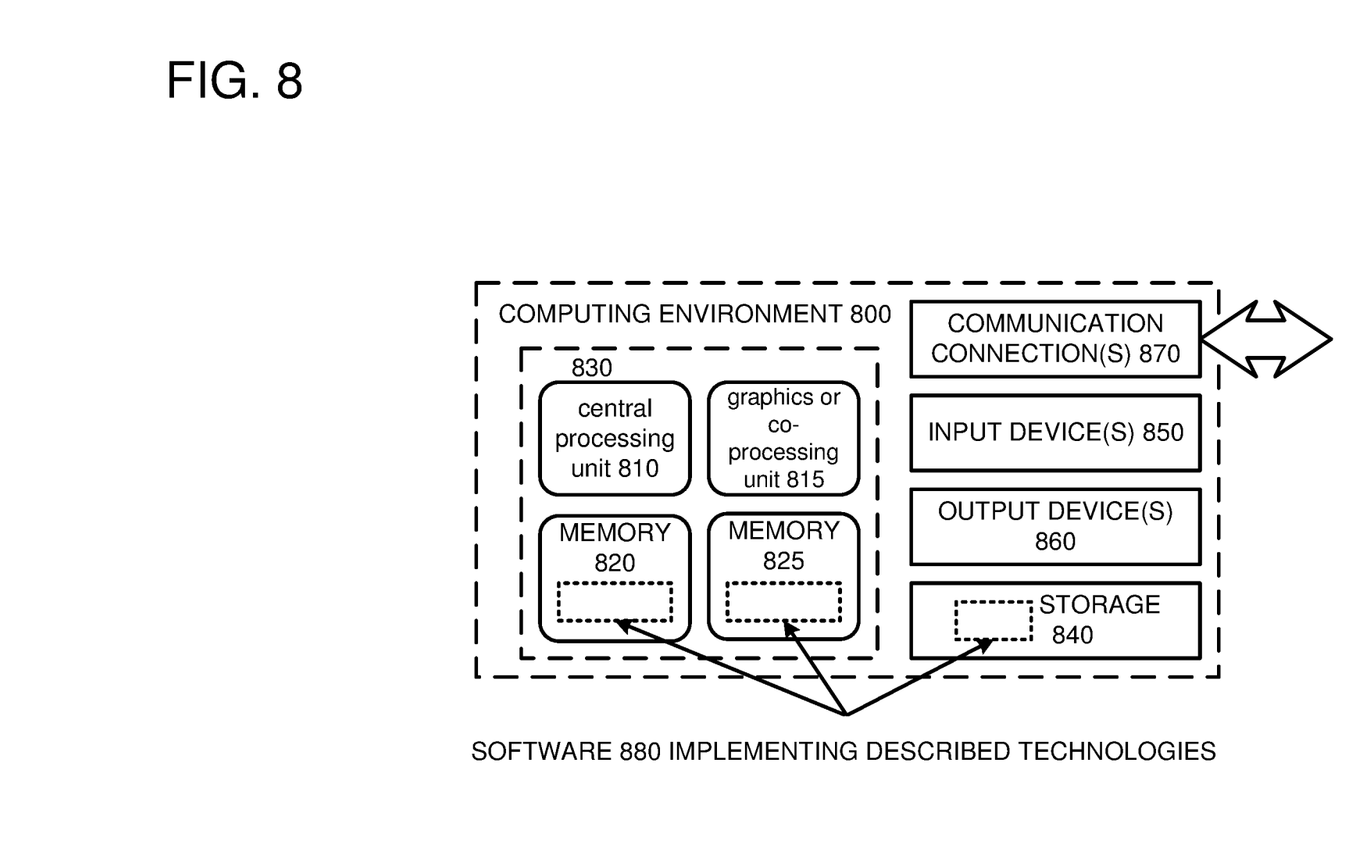
FIG. 8 depicts a generalized example of a suitable computing environment in which some of the described examples may be implemented.

FIG. 8 depicts a generalized example of a suitable computing environment 800 in which at least some of the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.). The computing environment 800 can be used as a computing device in any of the examples described herein.

With reference to FIG. 8, the computing environment 800 includes one or more processing units 810, 815 and memory

820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). In at least some embodiments, the memory 820 and/or the memory 825 can be a memory in any of the example systems described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. For example, the storage can be a hardware device as described in any of the example systems described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800. In at least some embodiments, the input device(s) 850 and/or output device(s) 860 can be hardware devices in any of the example systems as described herein.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the communication connection(s) 870 can comprise one or more communication devices. Such communication devices can be hardware devices in any of the example systems described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We claim as our invention all that comes within the scope of the following claims.

What is claimed is:

1. A system for identifying a hardware device that transmitted an error message, the system comprising:
a processor;
a memory;
a plurality of hardware devices connected to a serial data bus root complex, wherein each of the hardware devices is operative to transmit error messages to the serial data bus root complex;
the serial data bus root complex, configured to:
receive an error message from a hardware device of the plurality of hardware devices, and
responsive to receiving the error message, transmit a first interrupt to a firmware connected to the serial data bus root complex;
the firmware, comprising an interrupt handler, wherein the interrupt handler is configured to:
receive the first interrupt from the serial data bus root complex,
determine an identifier for the hardware device of the plurality of hardware devices based on the error message received by the serial data bus root complex,
store the identifier for the hardware device of the plurality of hardware devices in the memory, and
transmit a second interrupt to an operating system; and
the operating system, comprising a hardware error handler, wherein the hardware error handler is configured to:
receive the second interrupt;
retrieve the identifier for the hardware device of the plurality of hardware devices from the memory; and
use the retrieved identifier to determine that the hardware device of the plurality of hardware devices sent the error message.

2. The system of claim 1, wherein:
the error message comprises a Peripheral Component Interconnect Express (PCIe) message comprising a message header;
the serial data bus root complex is further configured to store the message header in a PCIe message header log; and
the determining the identifier for the hardware device based on the error message received by the serial data bus root complex comprises:
retrieving the message header from the PCIe message header log; and
retrieving the identifier for the hardware device from a data field of the message header.

3. The system of claim 2, wherein:
the interrupt handler of the firmware is further configured to:
retrieve a message code from the message header; and
store the message code in the memory; and the hardware error handler of the operating system is further configured to:
retrieve the message code from the memory; and
perform a hardware error remediation operation based on the identifier for the hardware device and the message code.

4. A system, comprising:
a communication bus chipset connected to a hardware device, wherein the communication bus chipset is configured to:
receive an error message from the hardware device, wherein the error message comprises an identifier for the hardware device; and
responsive to receipt of the error message, transmit an interrupt to an interrupt handler connected to the communication bus chipset; and
wherein the interrupt handler is configured to:
receive the interrupt from the communication bus chipset;
responsive to receipt of the interrupt, retrieve the identifier for the hardware device from the error message transmitted to the communication bus chipset by the hardware device; and
transmit an error notification to a remediation service, wherein the error notification is associated with the identifier for the hardware device.

5. The system of claim 4, wherein:
the system further comprises:
a memory connected to the communication bus chipset, and
the remediation service; and
the interrupt handler is further configured to store the identifier for the hardware device in the memory, and the remediation service is configured to retrieve the identifier for the hardware device from the memory, responsive to receipt of the error notification.

6. The system of claim 5, wherein the memory comprises a non-volatile random access memory that is accessible by a firmware and an operating system.

7. The system of claim 5, wherein:
the remediation service comprises an error workflow handler of an operating system configured to receive the error notification; and
transmitting the error notification to the remediation service comprises transmitting an interrupt to the operating system.

8. The system of claim 4, wherein the interrupt handler is further configured to:
retrieve an error type from the error message;
determine, using the error type, that the hardware device encountered a non-recoverable error; and
transmit the error notification to the remediation service responsive to the determining.

9. The system of claim 4, wherein the communication bus chipset comprises a Peripheral Component Interconnect Express root complex.

10. The system of claim 4, further comprising:
a firmware connected to the communication bus chipset, wherein the firmware comprises the interrupt handler.

11. The system of claim 10, wherein:
the interrupt handler comprises a system management module of the firmware, wherein the system management module is configured to support a system management mode of execution upon receipt of a system management interrupt; and the interrupt transmitted to the interrupt handler by the communication bus chipset comprises the system management interrupt.

12. The system of claim 10, wherein the firmware comprises a basic input/output system (BIOS) of a motherboard, wherein the motherboard is connected to the communication bus chipset.

13. The system of claim 4, wherein:
the error message comprises a message header comprising the identifier for the hardware device; and
the retrieving the identifier for the hardware device from the error message transmitted to the communication bus chipset by the hardware device comprises:
retrieving the message header of the error message from a message header log; and
extracting the identifier for the hardware device from the message header.

14. A method comprising:
receiving an error interrupt at an interrupt handler via a serial data bus, wherein the error interrupt is transmitted responsive to receipt of an error message from a hardware device via the serial data bus;
responsive to receipt of the error interrupt, determining an identifier for the hardware device that transmitted the error message;
storing the identifier for the hardware device, by the interrupt handler, in a memory; and
transmitting an error notification, by the interrupt handler, to a remediation service.

15. The method of claim 14, further comprising:
receiving the error notification by the remediation service; and
responsive to receiving the error notification, retrieving the identifier for the hardware device from the memory by the remediation service.

16. The method of claim 14, wherein:
the error message comprises a data packet comprising a packet header; and
determining the identifier for the hardware device comprises locating the identifier for the hardware device in a data field of the packet header.

17. The method of claim 16, wherein determining the identifier for the hardware device further comprises:
retrieving the packet header from a message header log, wherein the retrieving comprises transmitting a message to a root complex of the serial data bus to access the message header log.

18. The method of claim 14, further comprising:
storing, by the interrupt handler, a message code of the error message in the memory;
retrieving, by the remediation service, the message code from the memory; and
performing, by the remediation service, an error remediation operation based on the message code.

19. The method of claim 14, wherein transmitting the error interrupt to the interrupt handler comprises transmitting the error interrupt to a system firmware connected to the serial data bus.

20. The method of claim 19, wherein:
the interrupt handler comprises a system management module of the system firmware; and
the error interrupt is a system management interrupt transmitted to the system firmware by a root complex device of the serial data bus.

* * * * *